(12) United States Patent
Kawahara et al.

(10) Patent No.: US 6,459,512 B1
(45) Date of Patent: *Oct. 1, 2002

(54) COLOR IMAGE READING APPARATUS

(75) Inventors: Atsushi Kawahara, Melville, NY (US); Hideo Hoshuyama, Kawasaki (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,112

(22) Filed: Nov. 20, 1998

(30) Foreign Application Priority Data

Nov. 20, 1997 (JP) ................................. 9-319608

(51) Int. Cl.$^7$ ................................................ H04N 1/46
(52) U.S. Cl. ...................................... 358/515; 358/518
(58) Field of Search .................... 348/261, 263, 348/267, 272, 474, 505, 509, 512, 540

(56) References Cited

U.S. PATENT DOCUMENTS 5,923,042 A * 7/1999 Mietta .................... 250/559.06
6,163,344 A * 12/2000 Kawamura .................. 348/552

FOREIGN PATENT DOCUMENTS

| JP | 359161983 | * 9/1984 | ............ H04N/1/46 |
| JP | 403150174 | * 6/1991 | ............ B41J/2/44 |
| JP | 06326883 A | * 11/1994 | ............ H04N/1/46 |

* cited by examiner

Primary Examiner—Jerome Grant, II
(74) Attorney, Agent, or Firm—Staas & Halsey LLP

(57) ABSTRACT

A color image reading apparatus includes a color separation unit to separate a color of an image of an object into more than three visible color wavelength components in a visible wavelength range and an image sensing unit to read the image of the object whose color is separated by the color separation unit and outputting image signals of the respective colors. The apparatus also has a color calculation circuit to calculate image data of not less than three colors from the image signals corresponding to the colors separated by said color separation unit.

11 Claims, 13 Drawing Sheets

COLOR IMAGE READING APPARATUS

The entire disclosure of Japanese Patent Application No. 9-319608 including specifications, claims, drawings, and summaries is incorporated herein by reference in their entirety.

BACKGROUND OF THE INVENTION

1. Field of the Invention

The present invention relates to a color image reading apparatus.

2. Related Background Art

A color image reading apparatus for switching illumination light generally uses three light sources for emitting red (R), green (G), and blue (B) light components, respectively. The wavelength of illumination light is switched by sequentially switching the light source to be turned on.

A color image is reproduced on the basis of R, G, and B image componentswhich have been read using an R, G, and B light sources, respectively.

The conventional color image reading apparatus uses a fluorescent lamp or the like as a light source. Some recent apparatuses use a light-emitting diode as a light source.

Recent light-emitting diodes are quite useful as illumination light sources because of high luminance. In addition, various light-emitting diodes having different emission wavelengths are available.

When light-emitting diodes are used as light sources, three light-emitting diodes, i.e., a red light-emitting diode having a peak emission wavelength in the range longer than 600 [nm], a green light-emitting diode having a peak emission wavelength near 550 [nm], and a blue light-emitting diode having a peak emission wavelength in the range shorter than 500 [nm] are used.

Popular color image reading apparatuses directly output the data of read R (red), G (green), and B (blue) color components. On the other hand, some color image reading apparatuses execute color correction calculation to improve color reproducibility. As the color correction calculation, for example, 3×3 matrix calculation is performed.

The conventional color image reading apparatuses cannot obtain sufficient color reproduction performance when an image is read from an original such as a color reversal film with a wide color gamut. That is, the color image reading apparatuses fail to provide satisfactory color reproduction capability. Especially, when a film having four photosensitive layers is used as an original, the color development characteristics of the film are more complex than the color reproduction capability of the color image reading apparatus. For this reason, the color difference between the actual original image and the read image becomes more conspicuous.

The color reproducibility is somewhat improved by executing color correction calculation. However, the color reproducibility is still poor. Especially, when a film having four photosensitive layers is used as an original, further improvement of color reproducibility is required.

Color image reading apparatuses sequentially read images of the R, G, and B color components. This prolongs the image reading time as compared to monochrome reading.

When the emission intensity of the illumination light source is low, the illuminance of the illuminated original surface is low. To read the image at a sufficient brightness, the exposure time (charging time) of the image sensing device must be made longer. As the exposure time becomes longer, the image reading time also becomes longer.

SUMMARY OF THE INVENTION

It is an object of the present invention to improve the color reproducibility of a color image reading apparatus without largely increasing cost. It is another object of the present invention to provide a color image reading apparatus capable of shortening the image reading time.

According to the present invention, there is provided a color image reading apparatus comprising:

a color separation unit to separate a color of an image of an object into not less than four visible color wavelength components in a visible wavelength range;

an image sensing unit to read the image of the object whose color is separated by the color separation unit and outputting image signals of the respective colors; and a color calculation circuit to calculate image data of not less than three colors from the image signals corresponding to the colors separated by the color separation unit.

The color image reading apparatus according to one mode of the present invention has a light source having four or more types of light emitters which have different peak emission wavelengths in the visible light range, an illumination optical system for illuminating an original with light from the light source, an image forming optical system for forming the image of the original illuminated by the illumination optical system, a one-dimensional image sensing unit for reading the image formed by the image forming optical system as a one-dimensional image, a subscan unit for moving the position of the original relative to the one-dimensional image sensing unit in an axial direction crossing the axial direction of the one-dimensional image, an emission color switching unit for controlling the state of each of the four or more types of light emitters to switch the emission color of the light source, and color calculation means for obtaining three or more color-converted data on the basis of a plurality of color data obtained from the image sensing unit.

In this apparatus, the light source for illuminating the original has four or more types of light emitters which have different peak emission wavelengths in the visible light range. The emission color switching device controls the state of each of the four or more types of light emitters to switch the emission color of the light source. The original is illuminated with light from the light source through the illumination light system. The image of the illuminated original is formed on the one-dimensional image sensing device by the image forming optical system. The one-dimensional image sensing device reads the image formed by the image forming optical system as a one-dimensional image. Since the subscan means moves the position of the original relative to the one-dimensional image sensing means in the axial direction crossing the axial direction of the one-dimensional image, the two-dimensional image of the original can be read.

The color calculation means obtains three or more color-converted data on the basis of a plurality of color data obtained from the image sensing means. For example, when five types of light emitters of R (red), Y (yellow), G (green), C (cyan), and B (blue) are used, the image of each of the R, Y, G, C, and B color components can be sequentially read.

To output color image data having three color components of R, G, and B, which are generally used, image data of three color components of R, G, and B are generated from image data of each of the color components of R, Y, G, C, and B by calculation (conversion) by the color calculation means. The color data of the image generated on the basis of the image data of four or more color components has good color reproducibility as compared to color data obtained by the conventional image reading apparatus. Therefore, even when a film having four photosensitive layers is used as an original, the color image reading apparatus of the present invention can reproduce the color of the original image more accurately.

In this color image reading apparatus, the emission color switching means may have, as a reading mode, a first mode in which the emission color of the light source is sequentially switched to any one of three colors, and a second mode in which the emission color of the light source is sequentially switched to any one of N colors (N≧4). More preferably, the color calculation means automatically may switch the contents of formulas representing the correlation between the input color data of three or more colors and output color data of three or more colors in accordance with the reading mode of the emission color switching means.

When images of four or more color components are to be sequentially read, in some cases, the reading time may become longer than that in reading images of three color components due to more complicated image processing etc. When a film having four photosensitive layers is used as an original, high color reproducibility is required for the color image reading apparatus. However, when the original has a relatively narrow color gamut, it is sometimes more preferable to shorten the reading time rather than to increase the color reproducibility. When the first mode in which the emission color of the light source is sequentially switched to any one of three colors and the second mode in which the emission color of the light source is sequentially switched to any one of N colors (N≧4), the color reproducibility is relatively low while the reading time is relatively short in the first mode. In the second mode, the color reproducibility is improved while the reading time becomes longer.

The color components of input image data change between the first and second modes. The color calculation means automatically switches the contents of formulas representing the correlation between the input color data of three or more colors and output color data of three or more colors in accordance with the reading mode.

In this color image reading apparatus, when the emission color switching means selects a specific color as the color to be emitted by the light source in a specific reading mode, a plurality of light emitters having different peak emission wavelengths may be simultaneously driven to emit light. For example, B (blue) and C (cyan) have a small wavelength difference. For this reason, B and C can be regarded as one color (B). In this case, when the B and C light emitters are simultaneously turned on, the emission intensity of the light source increases as compared to a case wherein only the B light emitter emits light. Similarly, G (green) and Y (yellow) have a small wavelength difference. For this reason, G and Y can be regarded as one color (G). In this case, when the G and Y light emitters are simultaneously turned on, the emission intensity of the light source increases as compared to a case wherein only the G light emitter emits light. As the emission intensity of the light source increases, the illuminance of the original increases. For this reason, even when the exposure time of the image sensing device is shortened, a bright image can be read. That is, the image reading time can be shortened.

DESCRIPTION OF THE PREFERRED EMBODIMENT

An embodiment of the present invention will be described below with reference to FIGS. 1 to 15.

Figure 1:
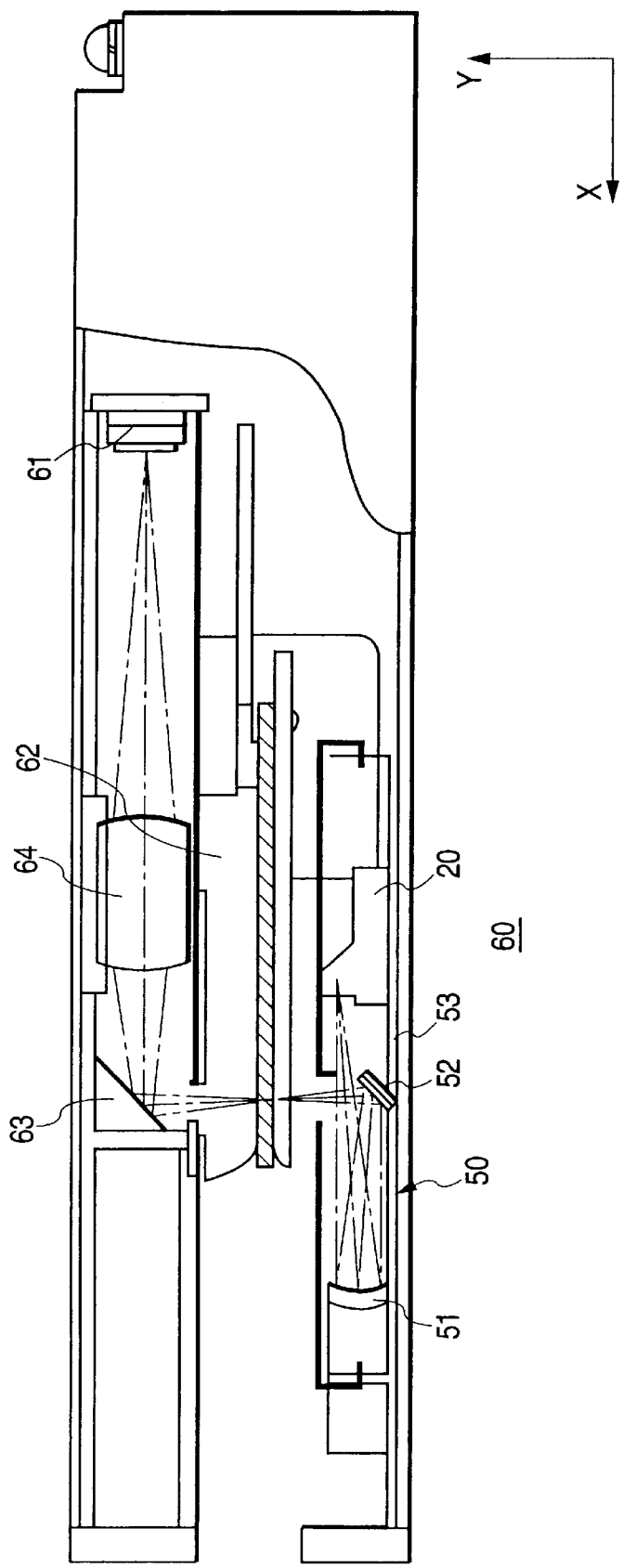
FIG. 1 is a partially cutaway front view of an image reading apparatus.

The schematic arrangement of an image reading apparatus 60 will be described first with reference to FIG. 1. This image reading apparatus 60 uses, as an original, a negative film or reversal (or positive) film photographed with a camera. The original is held inside a holder 62 and loaded in the image reading apparatus 60. The holder 62 is supported to freely move in an axial direction indicated by an arrow X by a driving mechanism (not shown). When an electrical motor M1 (to be described later) is driven, the holder 62 moves in the X-axis direction.

Figure 5:
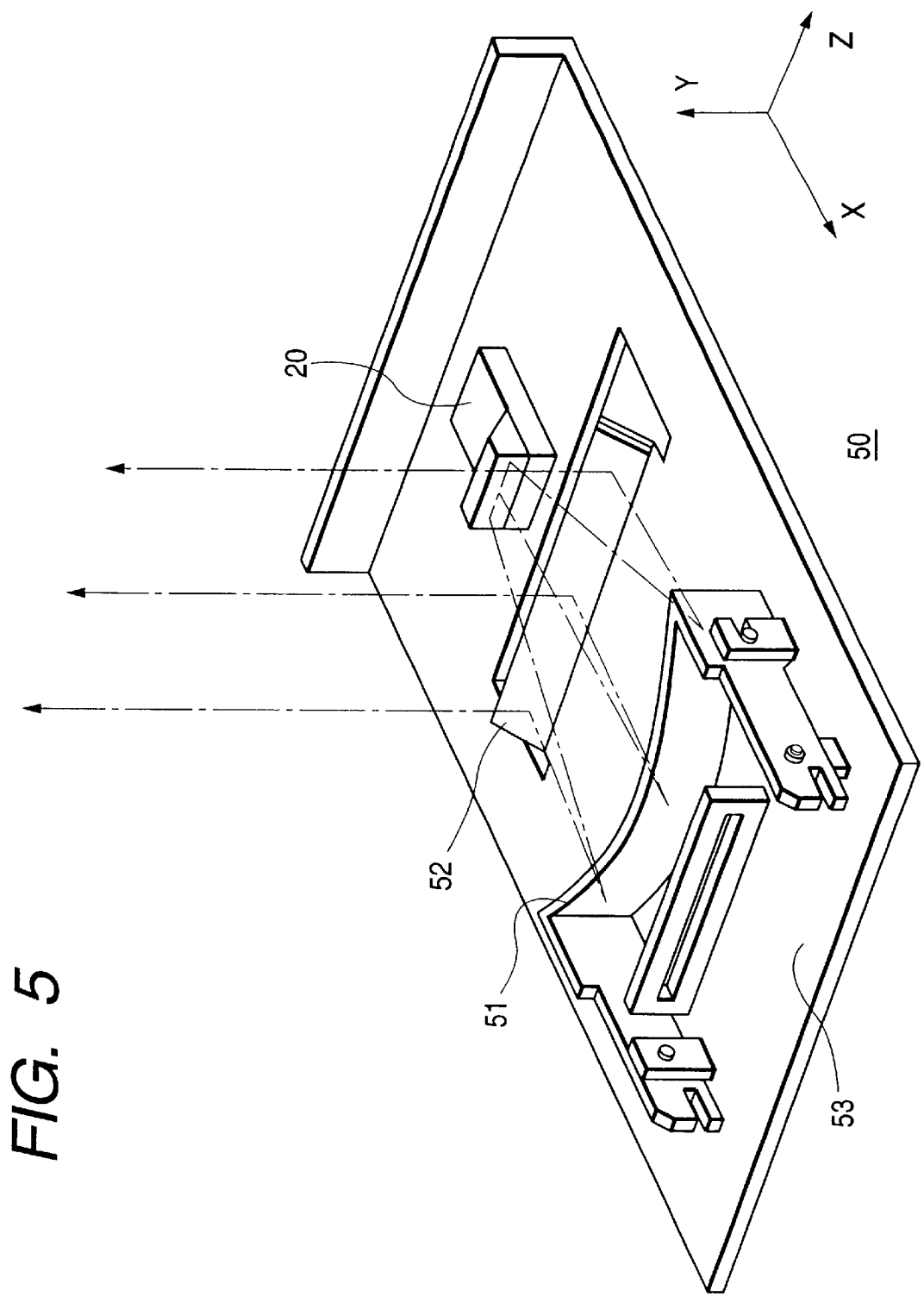
FIG. 5 is a perspective view showing the illumination unit of the image reading apparatus shown in FIG. 1.

The image reading apparatus 60 has an illumination unit 50 incorporating a light source unit 20. FIG. 5 shows the outer appearance of the illumination unit 50. As shown in FIG. 1, the original in the holder 62 is illuminated from the lower side by the illumination unit 50. Light transmitted through the original is reflected by a mirror 63 inserted above the original and is incident on the image sensing surface of a linear image sensor 61 through a lens 64.

Figure 6:
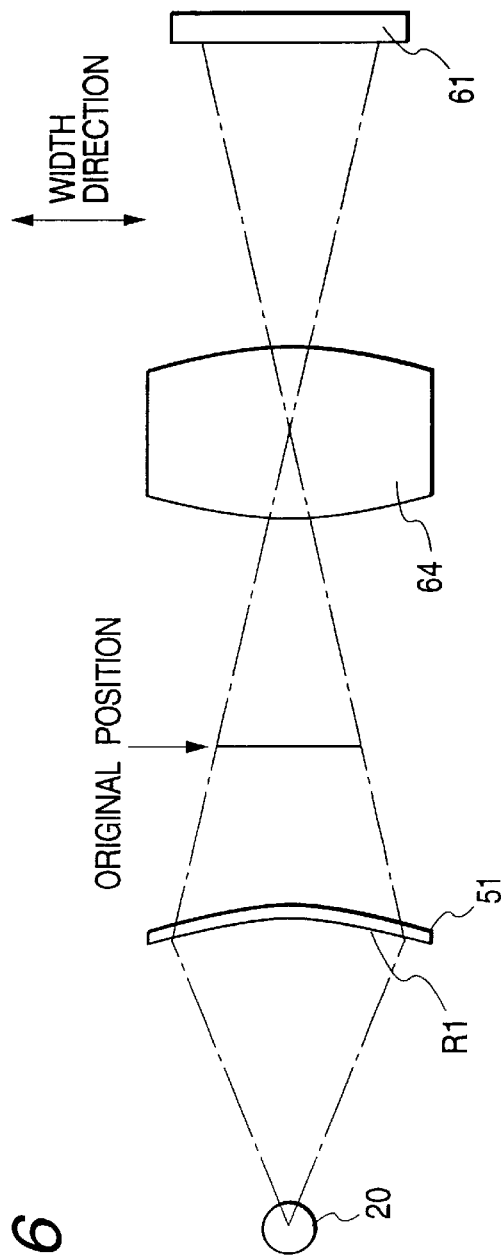
FIG. 6 is a schematic exploded view showing the optical path from the light source unit to a linear image sensor.
Figure 7:
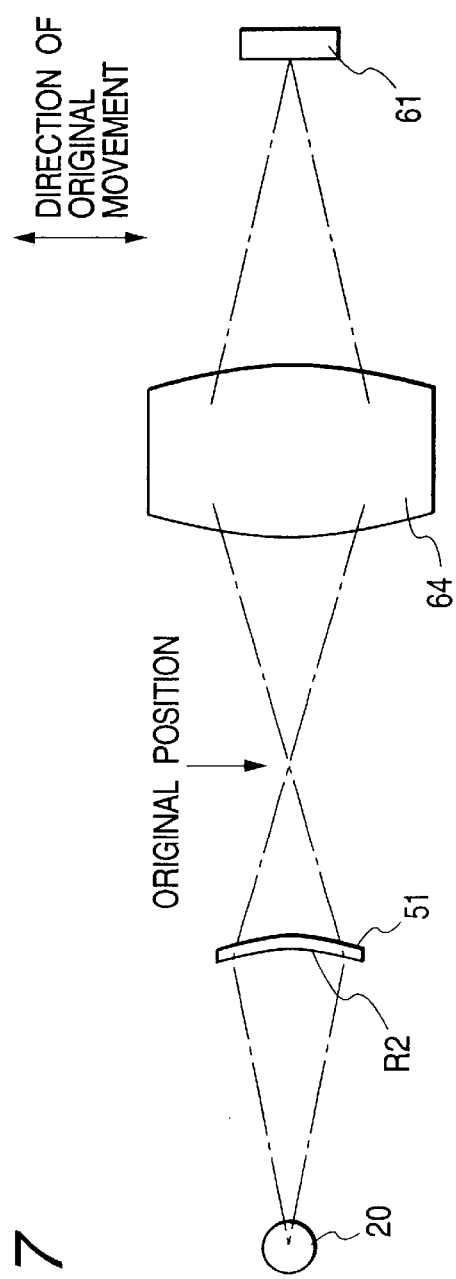
FIG. 7 is a schematic exploded view showing the optical path from the light source unit to the linear image sensor.

FIGS. 6 and 7 show the optical path from the light source unit 20 to the image sensing surface of the linear image sensor 61. To accommodate the illumination optical system in a limited space, the optical path is converted in the illumination unit 50. More specifically, as shown in FIG. 5, light emitted by the light source unit 20 is reflected by a toric mirror 51 and then by a mirror 52 toward the original. To guide the light reflected by the toric mirror 51 to the mirror 52, the axis of light emitted by the light source unit 20 is slightly tilted downward. As shown in FIG. 7, the optical path is adjusted by a curved surface R2 of the toric mirror 51 to illuminate only a small area at the original position in the direction of original movement. As shown in FIG. 6, the optical path is also adjusted by a curved surface R1 of the toric mirror 51 to illuminate a region corresponding to a full line width at the original position.

To read a color image, the light source unit 20 of the image reading apparatus 60 can emit a plurality of illumination light components having different wavelengths. More specifically, the R, G, and B color components of the original image can be read using R, G, and B illumination light components, respectively. Especially, in this example, to improve the color reproducibility of an image, the light source unit 20 capable of emitting five illumination light components, i.e., R (red), Y (yellow), G (green), C (cyan), and B (blue) light components is used.

Figure 3:
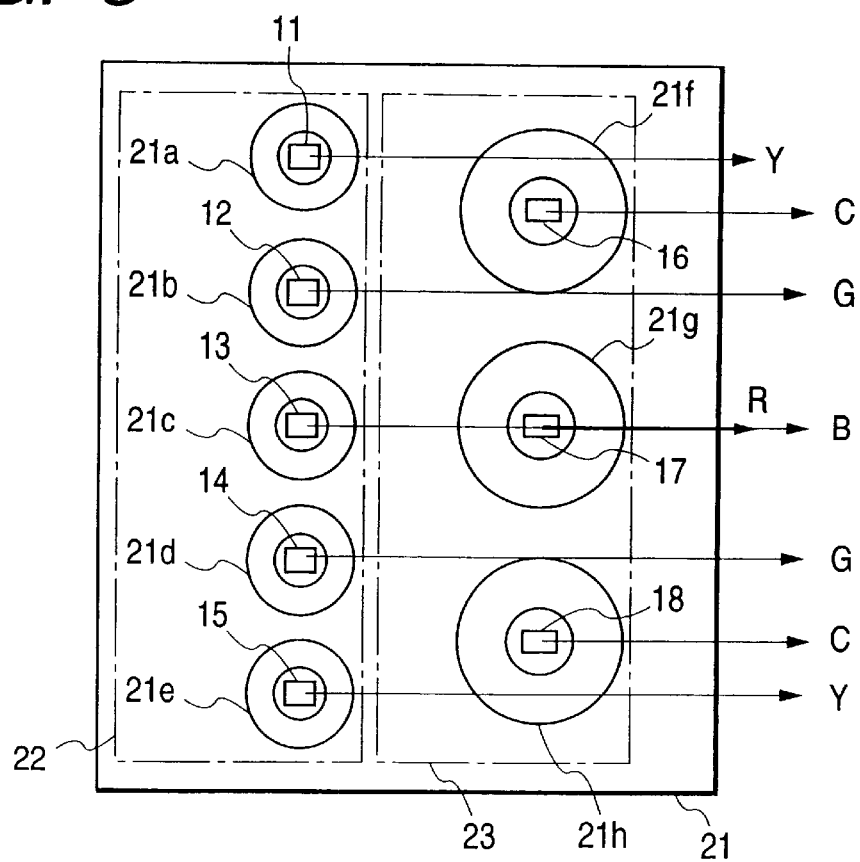
FIG. 3 is a plan view of the light source unit.
Figure 4:
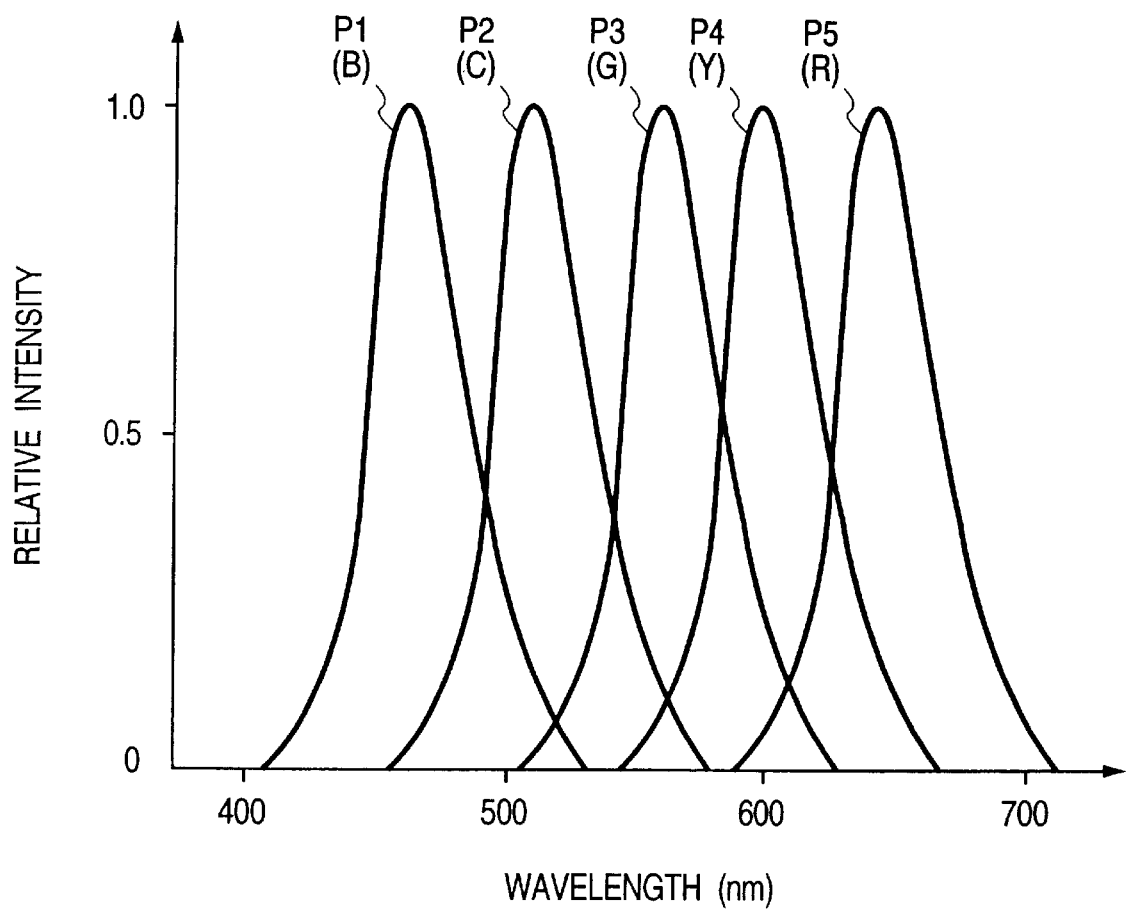
FIG. 4 is a graph showing the characteristics of five light-emitting elements used in the light source unit.

As shown in FIG. 3, eight light-emitting diode chips 11 to 18 are set on a board 21 constituting the main portion of the light source unit 20. The light-emitting diode chips 11, 12, 13, 14, 15, 16, 17, and 18 emit Y, G, R, G, Y, C, B, and C light components, respectively. The light-emitting diode chips 11 and 15 have the same emission characteristics. The light-emitting diode chips 12 and 14 have the same emission characteristics. The light-emitting diode chips 16 and 18 have the same emission characteristics. The emission characteristics of the five light-emitting diode chips 17, 16, 12, 11, and 13 are shown in FIG. 4 as characteristics P1, P2, P3, P4, and P5, respectively.

Figure 2:
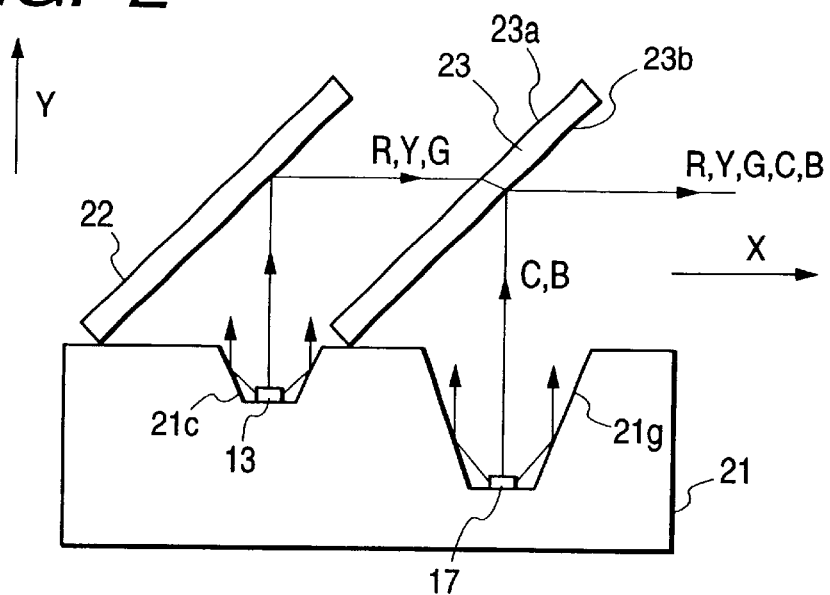
FIG. 2 is a longitudinal sectional view showing the light source unit of the image reading apparatus shown in FIG. 1.

As shown in FIGS. 2 and 3, the light-emitting diode chips 11, 12, 13, 14, 15, 16, 17, and 18 are mounted on the bottoms of recesses 21a, 21b, 21c, 21d, 21e, 21f, 21g, and 21h formed in the board 21, respectively. The inner walls of the recesses 21a to 21h of the board 21 reflect transverse light emitted by the light-emitting diode chips 11 to 18 in a direction indicated by an arrow Y.

C illumination light emitted by the light-emitting diode chips 16 and 18 and B illumination light emitted by the light-emitting diode chip 17 are reflected by a surface 23b of a spectral filter 23 to travel almost in a direction indicated by an arrow X, as shown in FIG. 2. Y illumination light emitted by the light-emitting diode chips 11 and 15, G illumination light emitted by the light-emitting diode chips 12 and 14, and R illumination light emitted by the light-emitting diode chip 13 are reflected by a total reflection mirror 22, refracted by a surface 23a of the spectral filter 23, transmitted through the spectral filter 23, and refracted by the surface 23b to travel almost in the direction indicated by the arrow X, as shown in FIG. 2. That is, all the R, Y, G, C, and B illumination light components emitted by the light source unit 20 travel in the X direction. Therefore, as shown in FIGS. 1 and 5, the original supported by the holder 62 can be illuminated with the light emitted by the light source unit 20.

Figure 8:
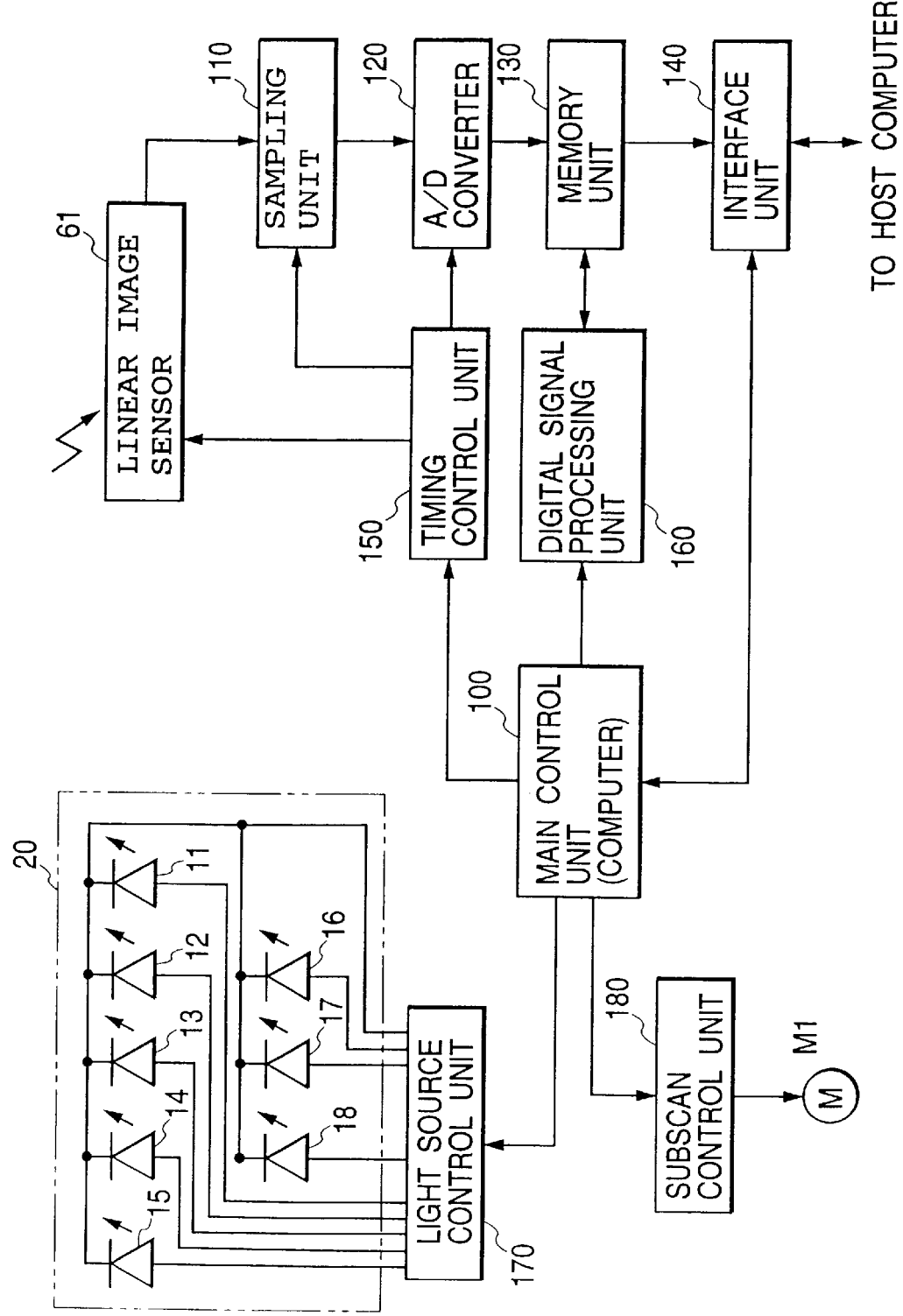
FIG. 8 is a block diagram showing the electrical circuit in the image reading apparatus 60 shown in FIG. 1.

As shown in FIG. 8, the electrical circuit in the image reading apparatus 60 comprises a main control unit 100, a sampling unit 110, an A/D converter 120, a memory unit 130, an interface unit 140, a timing control unit 150, a digital signal processing unit 160, a light source control unit 170, and a subscan control unit 180. The main control unit 100 controls the entire operation of the image reading apparatus 60. The main control unit 100 incorporates a microcomputer.

To read an image, the timing control unit 150 supplies various timing signals (pulse signals) necessary for image reading to the linear image sensor 61. The linear image sensor 61 reads the image in units of lines in synchronism with the timing signal. Line images read by the linear image sensor 61 are sequentially output in units of pixels as an analog image signal.

The sampling unit 110 samples the analog image signal output from the linear image sensor 61 in synchronism with the timing signal supplied from the timing control unit 150.

More specifically, the sampling unit 110 extracts the signal level in units of pixels. The analog image signal sampled by the sampling unit 110 is converted into a digital signal by the A/D converter 120 and input to the memory unit 130. The memory unit 130 has a storage capacity which allows storage of color image data of at least one frame separated into five color components of R, Y, G, C, and B in this example.

When the five color components of R, Y, G, C, and B of the image are converted into three color components of R, G, and B in units of lines, i.e., color conversion is always performed before the completion of reading one frame image, the storage capacity of the memory unit 130 can be reduced.

The digital signal processing unit 160 performs predetermined image processing for the image data held by the memory unit 130 in accordance with an instruction from the main control unit 100. For example, the five color components of R, Y, G, C, and B are converted into three color components of R, G, and B.

The color image data held by the memory unit 130 is output to the interface unit 140 in response to a request from the host computer connected to the image reading apparatus 60 through the interface unit 140.

The light source control unit 170 turns on/off, i.e., ON/OFF-controls the light-emitting diode chips 11 to 18 of the light source unit 20 in accordance with an instruction from the main control unit 100. Instead of the ON/OFF control, the light source control unit 170 may control the magnitude of an energization current for each light-emitting diode. In either case, the magnitude of the energization current for each light-emitting diode is controlled in accordance with a desired light emission luminance.

The subscan control unit 180 controls drive of the electrical motor M1 in accordance with an instruction from the main control unit 100. The driving shaft of the electrical motor M1 is coupled to a subscan mechanism (not shown) for moving the holder 62 in the direction indicated by the arrow X.

Figure 9:
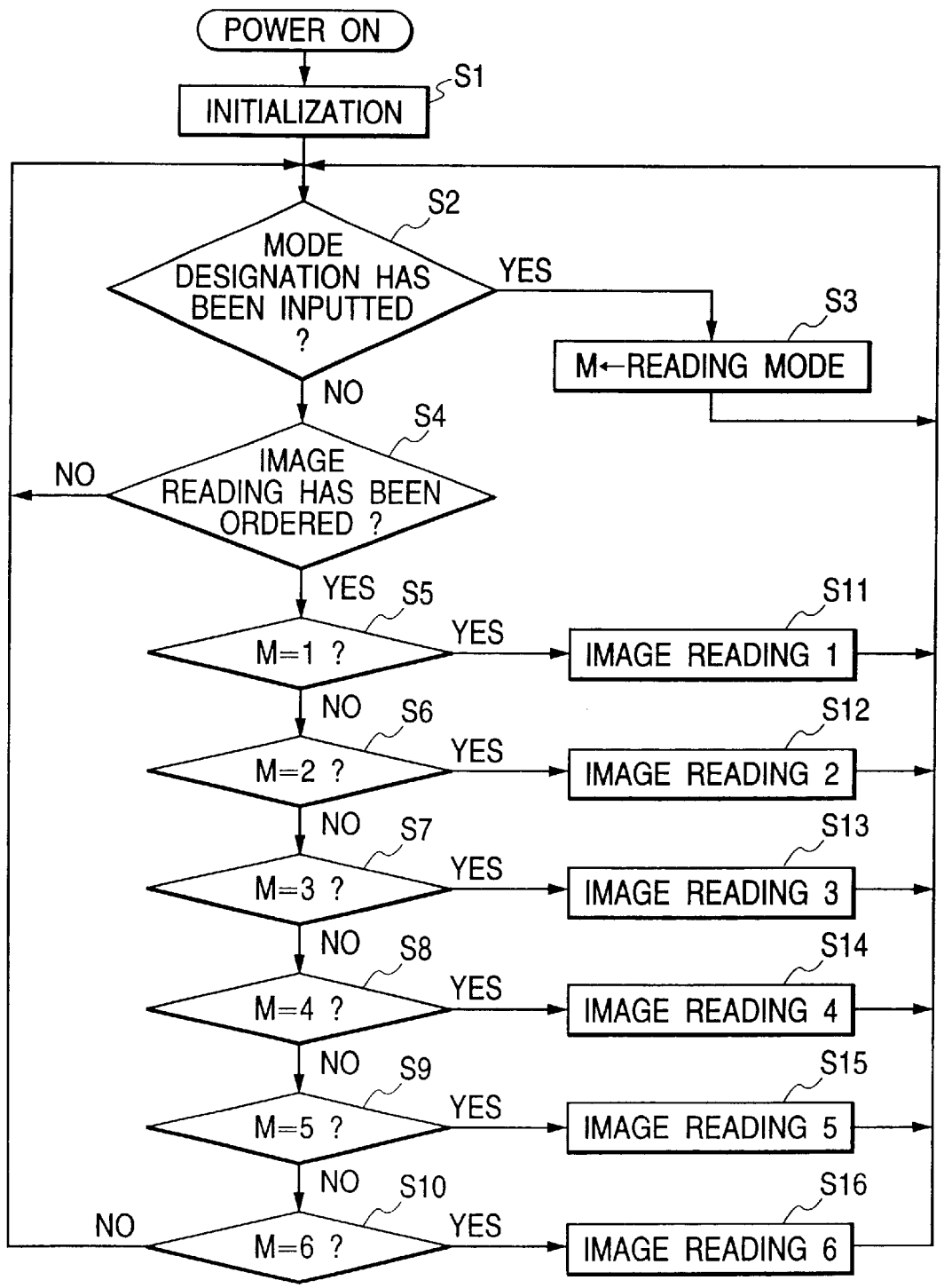
FIG. 9 is a flow chart showing operation of a main control unit shown in FIG. 8.

FIG. 9 schematically shows the operation of the main control unit 100. The contents of the respective steps will be described with reference to FIG. 9. In the following description, processing is executed by the microcomputer incorporated in the main control unit 100 unless otherwise specified.

In step S1, the entire system is initialized. More specifically, the main control unit 100, and the interface unit 140, timing control unit 150, digital signal processing unit 160, light source control unit 170, and subscan control unit 180 connected to the main control unit 100 are initialized. With this processing, the electrical motor M1 is stopped, and all the light-emitting diode chips 11 to 18 of the light source unit 20 are turned off. The main control unit 100 can communicate with a predetermined host computer connected through the interface unit 140.

In step S2, it is determined whether a predetermined mode designation has been inputted from the host computer. In this example, the image reading apparatus 60 has six reading modes. One of the reading modes is selected in accordance with the designation from the host computer. If YES in step S2, the flow advances from step S2 to step S3.

In step S3, the value of the reading mode designated by the host computer is set in a mode register M allocated in the internal memory.

In step S4, it is determined whether predetermined image reading has been ordered by the host computer. If YES in step S4, the flow advances from step S4 to step S5.

In step S5, the value held by the mode register M is compared with 1. That is, it is determined whether reading mode "1" has been set. If YES in step S5, the flow advances to step S11. If NO in step S5, the flow advances to step S6.

In step S6, the value held by the mode register M is compared with 2. That is, it is determined whether reading mode "2" has been set. If YES in step S6, the flow advances to step S12. If NO in step S6, the flow advances to step S7.

In step S7, the value held by the mode register M is compared with 3. That is, it is determined whether reading mode "3" has been set. If YES in step S7, the flow advances to step S13. If NO in step S7, the flow advances to step S8.

In step S8, the value held by the mode register M is compared with 4. That is, it is determined whether reading mode "4" has been set. If YES in step S8, the flow advances to step S14. If NO in step S8, the flow advances to step S9.

In step S9, the value held by the mode register M is compared with 5. That is, it is determined whether reading mode "5" has been set. If YES in step S9, the flow advances to step S15. If NO in step S9, the flow advances to step S10.

In step S10, the value held by the mode register M is compared with 6. That is, it is determined whether reading mode "6" has been set. If YES in step S10, the flow advances to step S16. If NO in step S10, the flow returns to step S2.

Figure 10:
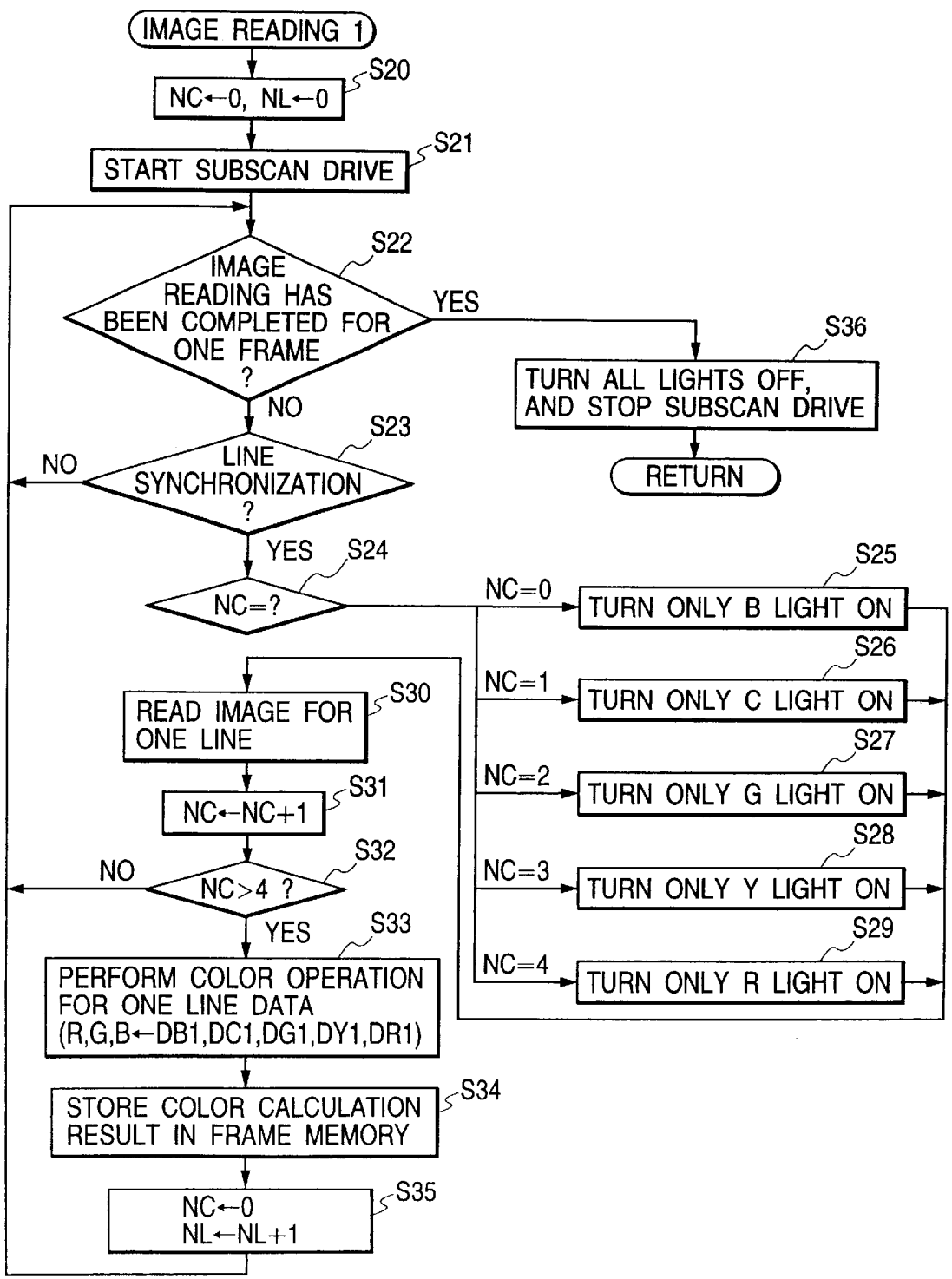
FIG. 10 is a flow chart showing contents of step S11 in FIG. 9.

In step S1, "image reading 1" is executed. Details of this processing are shown in FIG. 10. In "image reading 1", the color of light emitted by the light source unit 20 is sequentially changed to B, C, G, Y, and R to read the images of color components of B, C, G, Y, and R, respectively. Every time one line of the image is read, the color of light emitted by the light source unit 20 is switched. This processing will be described later in detail.

Figure 11:
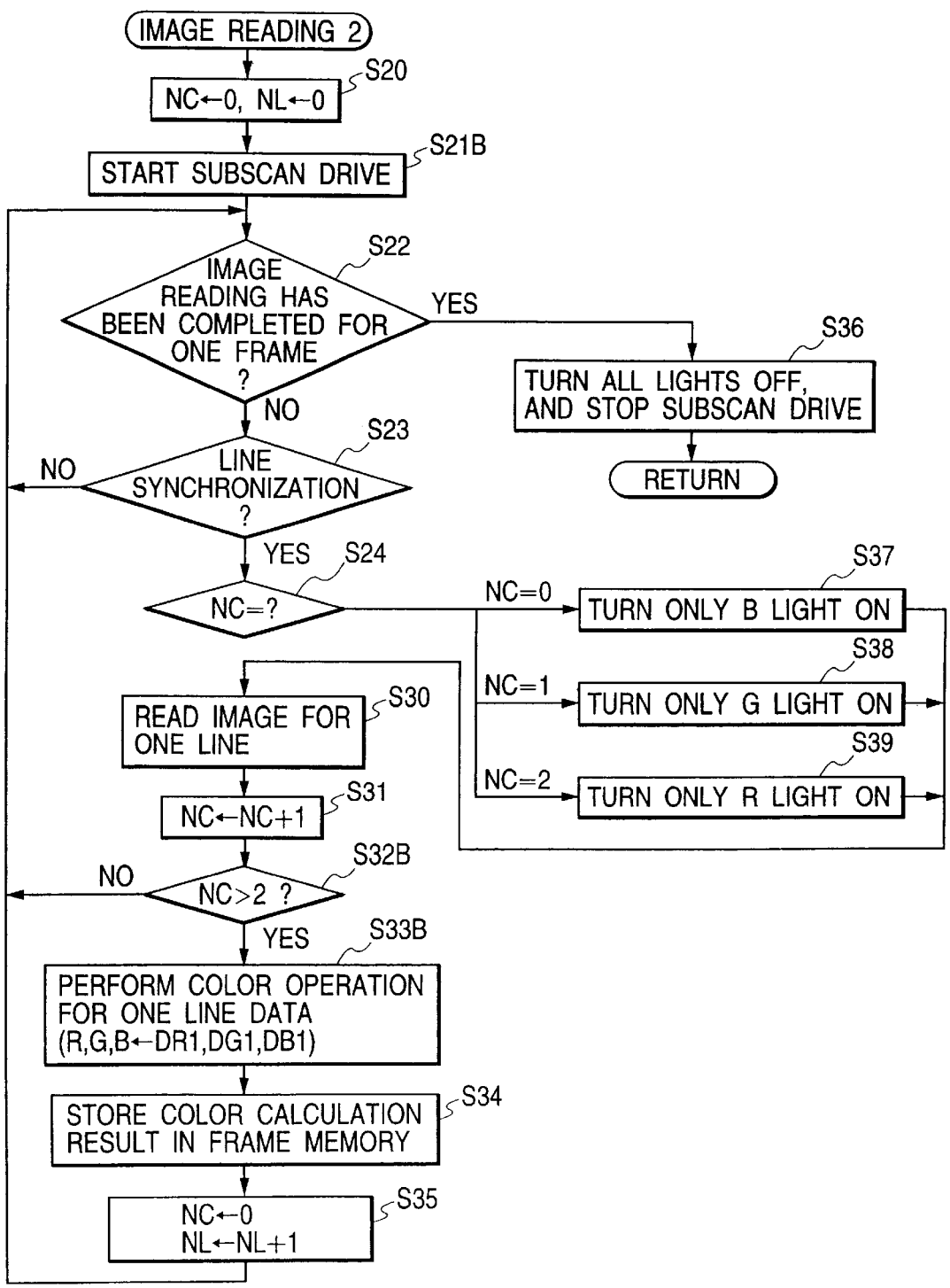
FIG. 11 is a flow chart showing contents of step S12 in FIG. 9.

In step S12, "image reading 2" is executed. Details of this processing are shown in FIG. 11. In "image reading 2", the color of light emitted by the light source unit 20 is sequentially switched to B, G, and R to read the images of color components B, G, and R, respectively. Every time one line of the image is read, the color of light emitted by the light source unit 20 is switched. This processing will be described later in detail.

Figure 12:
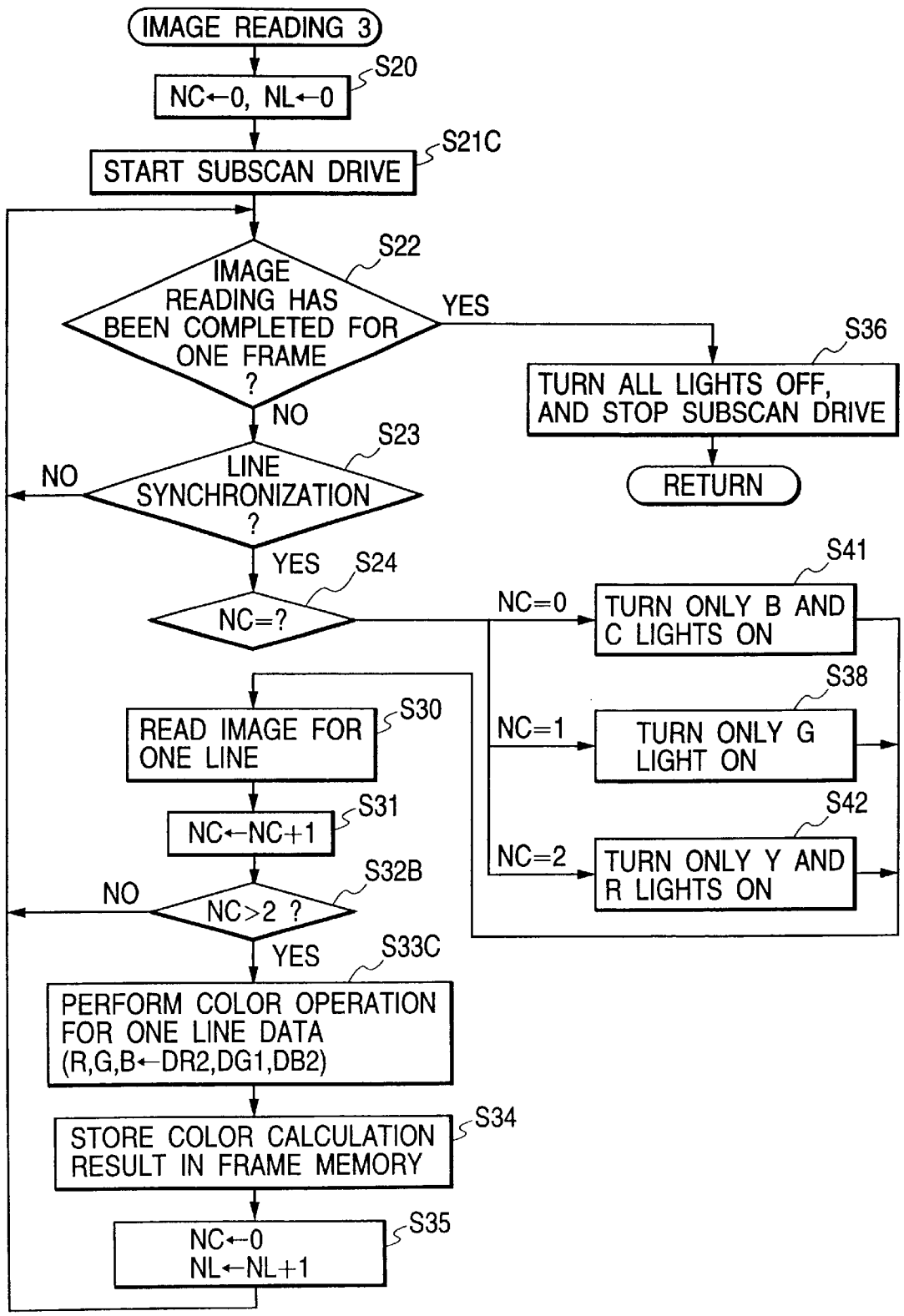
FIG. 12 is a flow chart showing contents of step S13 in FIG. 9.

In step S13, "image reading 3" is executed. Details of this processing are shown in FIG. 12. In "image reading 3", the color of light emitted by the light source unit 20 is sequentially switched to B, G, and R to read the images of color components B, G, and R, respectively. Especially, to cause the light source unit 20 to emit B light, not only the light-emitting diode chip 17 for emitting B light but also the light-emitting diode chips 16 and 18 for emitting C light are simultaneously turned on. To cause the light source unit 20 to emit R light, not only the light-emitting diode chip 13 for emitting R light but also the light-emitting diode chips 11 and 15 for emitting Y light are simultaneously turned on. The color of light emitted by the light source unit 20 is switched every time one line of the image is read. Details of this processing will be described later in detail.

Figure 13:
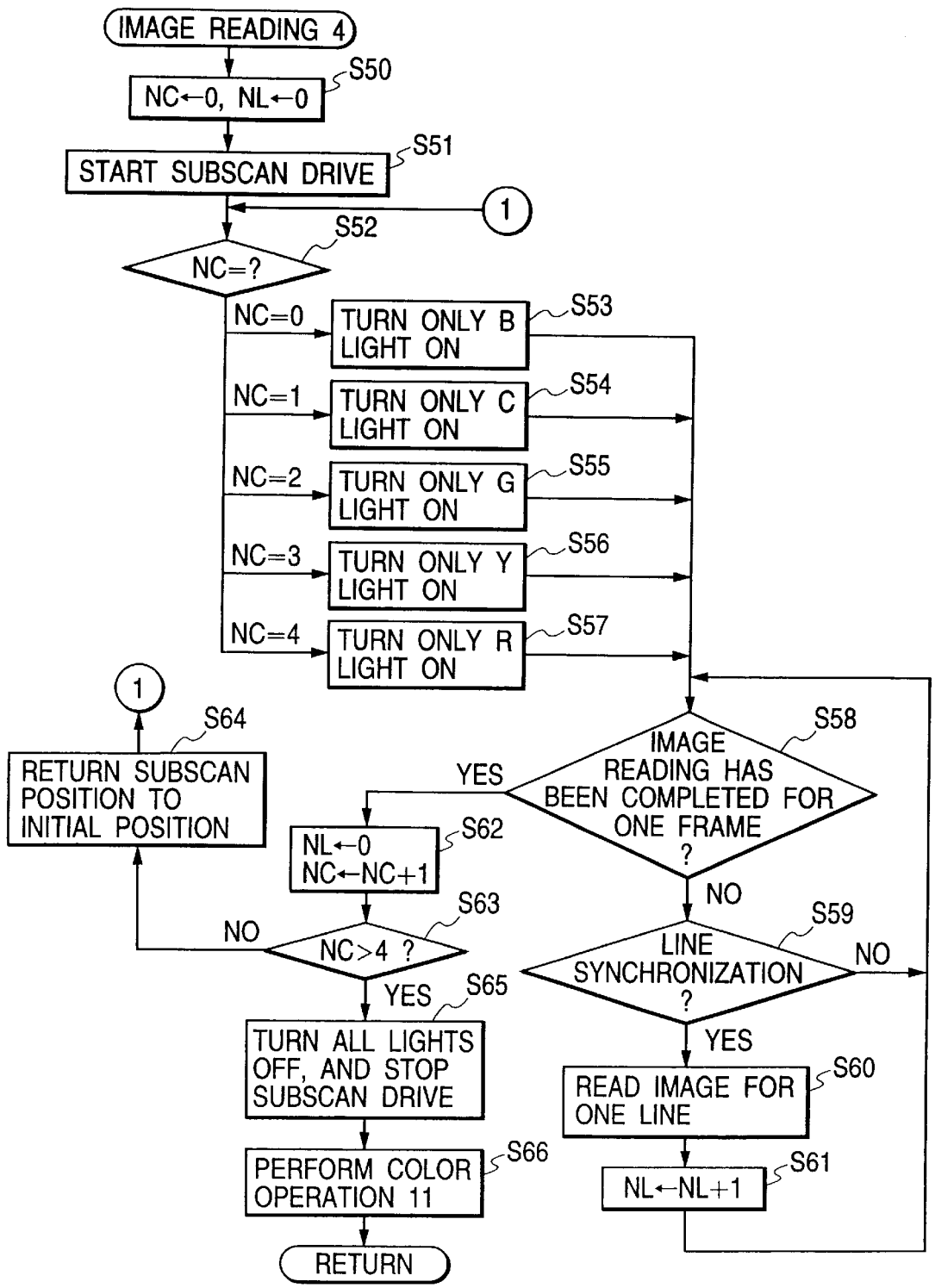
FIG. 13 is a flow chart showing contents of step S14 in FIG. 9.

In step S14, "image reading 4" is executed. Details of this processing are shown in FIG. 13. In "image reading 4", the color of light emitted by the light source unit 20 is sequentially switched to B, C, G, Y, and R to read the images of color components B, C, G, Y, and R, respectively. The color of light emitted by the light source unit 20 is switched every time one frame of the image is read. Details of this processing will be described later in detail.

Figure 14:
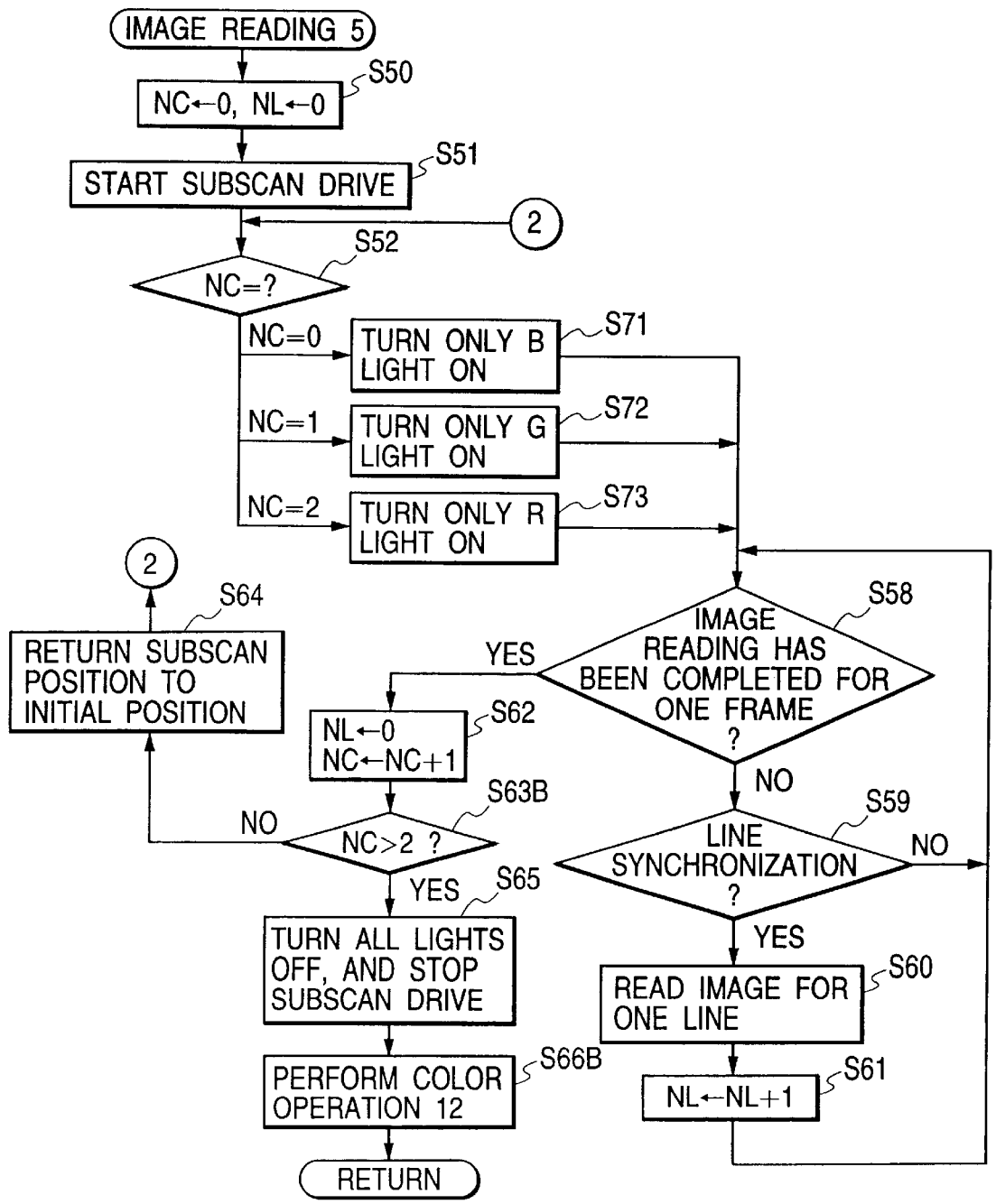
FIG. 14 is a flow chart showing contents of step S15 in FIG. 9.

In step S15, "image reading 5" is executed. Details of this processing are shown in FIG. 14. In "image reading 5", the color of light emitted by the light source unit 20 is sequentially switched to B, G, and R to read the images of color components B, G, and R, respectively. The color of light emitted by the light source unit 20 is switched every time one frame of the image is read. Details of this processing will be described later in detail.

Figure 15:
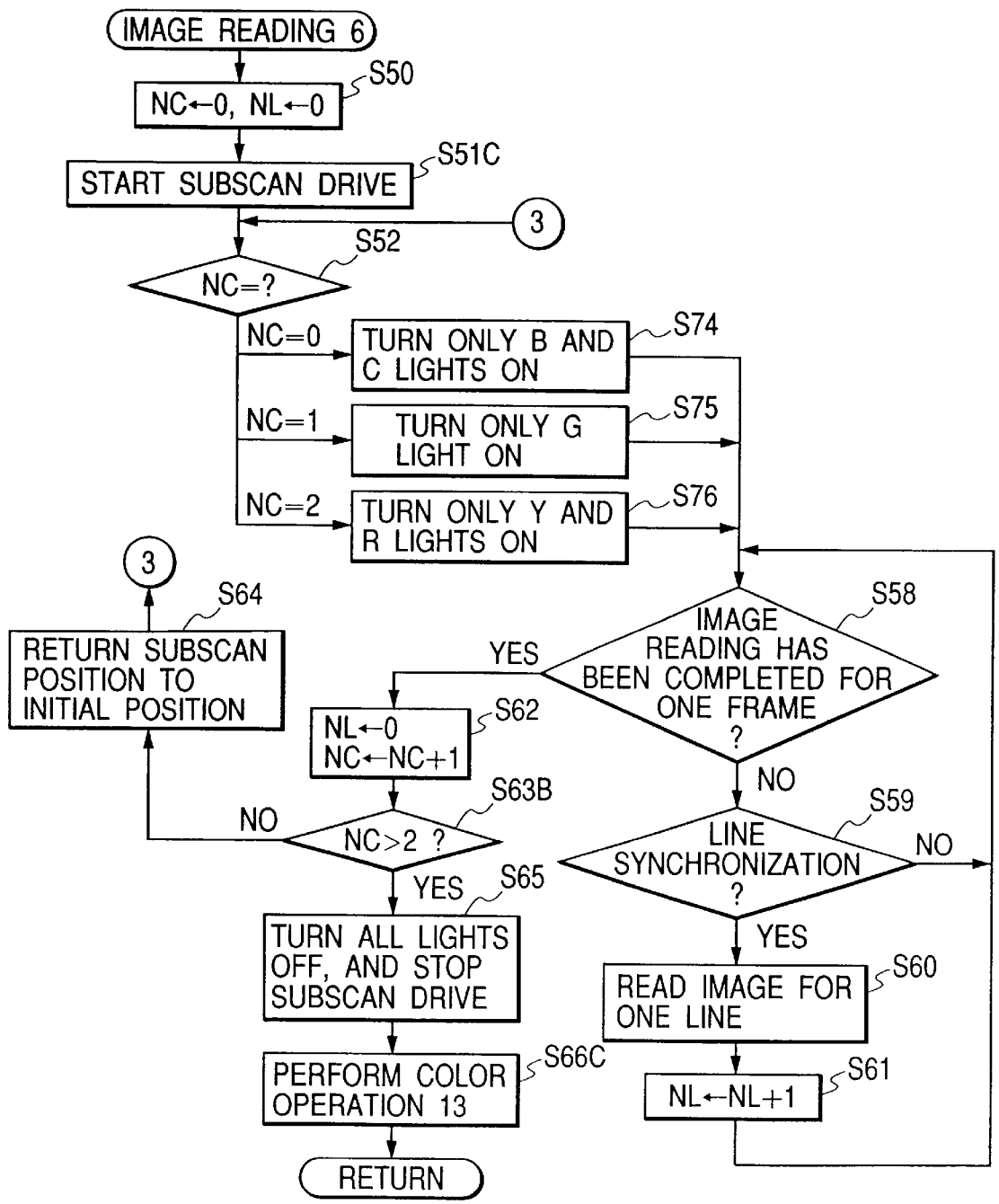
FIG. 15 is a flow chart showing contents of step S16 in FIG. 9.

In step S16, "image reading 6" is executed. Details of this processing are shown in FIG. 15. In "image reading 6", the color of light emitted by the light source unit 20 is sequentially switched to B, G, and R to read the images of color components B, G, and R, respectively. Especially, to cause the light source unit 20 to emit B light, not only the light-emitting diode chip 17 for emitting B light but also the light-emitting diode chips 16 and 18 for emitting C light are simultaneously turned on. To cause the light source unit 20 to emit R light, not only the light-emitting diode chip 13 for emitting R light but also the light-emitting diode chips 11 and 15 for emitting Y light are simultaneously turned on. The color of light emitted by the light source unit 20 is switched every time one frame of the image is read. Details of this processing will be described later in detail.

FIG. 9 shows only processing associated with image reading. However, for example, when an image data transfer request is issued from the host computer, image data is output from the memory unit 130 to the interface unit 140 in response to the request. This processing is omitted in FIG. 9.

"Image reading 1" executed in reading mode "1" will be described in detail with reference to FIG. 10.

In step S20, the contents of counters NC and NL allocated in the internal memory are initialized. The value of the counter NC represents a number assigned to the color of illumination. In this case, the values "0", "1", "2", "3", and "4" of the counter NC correspond to the B, C, G, Y, and R color components of light emitted by the light source unit 20, respectively. The value of the counter NL represents the scanning position in the subscan direction (X direction). Every time the images of all color components of one line are read, the value of the counter NL is updated.

In step S21, an instruction is issued to the subscan control unit 180 to start subscan drive. The electrical motor M1 is driven to move the holder 62 for supporting the original in the direction indicated by the arrow X at a predetermined speed. When the holder 62 moves, the relative positional relationship between the image reading position and the original supported by the holder 62 changes.

In step S22, it is determined whether image reading has been completed for one frame. More specifically, the value of the counter NL is compared with a predetermined threshold value to determine whether the scanning position in the subscan direction has moved by a distance corresponding to one frame.

If NO in step S22, the flow advances to step S23. If YES in step S22, the flow advances to step S36.

In step S23, the state of a line synchronizing signal which periodically appears every time one line image is read is monitored to determine whether a predetermined line synchronization timing is detected. If YES in step S23, the flow advances from step S23 to step S24.

In step S24, the next processing is selected in accordance with the value of the counter NC. When the value of the counter NC is "0", "1", "2", "3", or "4", the flow advances to step S25, S26, S27, S28, or S29, respectively.

In step S25, the light source control unit 170 is controlled to turn on the light-emitting diode chip 17 of the light source unit 20. All the remaining light-emitting diode chips 11, 12, 13, 14, 15, 16, and 18 are turned off. That is, B light is emitted as illumination light.

In step S26, the light source control unit 170 is controlled to turn on the light-emitting diode chips 16 and 18 of the light source unit 20. All the remaining light-emitting diode chips 11, 12, 13, 14, 15, and 17 are turned off. That is, C light is emitted as illumination light.

In step S27, the light source control unit 170 is controlled to turn on the light-emitting diode chip 12 and 14 of the light source unit 20. All the remaining light-emitting diode chips 11, 13, 15, 16, 17, and 18 are turned off. That is, G light is emitted as illumination light.

In step S28, the light source control unit 170 is controlled to turn on the light-emitting diode chips 11 and 15 of the light source unit 20. All the remaining light-emitting diode chips 12, 13, 14, 16, 17, and 18 are turned off. That is, Y light is emitted as illumination light.

In step S29, the light source control unit 170 is controlled to turn on the light-emitting diode chip 13 of the light source unit 20. All the remaining light-emitting diode chips 11, 12, 14, 15, 16, 17, and 18 are turned off. That is, R light is emitted as illumination light.

In step S30, an image is read for one line. More specifically, transmission light from the original illuminated with any one of the B, C, G, Y, and R light components is read by the linear image sensor 61 for one line.

The signal output from the linear image sensor 61 is input to the memory unit 130 through the sampling unit 110 and A/D converter 120. The signal input to the memory unit 130 is one of color signal components obtained by separating the image into five colors: B, C, G, Y, and R. The memory unit 130 holds the input color signal for one line in a line buffer allocated in the internal memory. The color signal components of B, C, G, Y, and R are held by different line buffers.

In step S31, the value of the counter NC is updated. Every time step S31 is executed, the value of the counter NC is incremented by one.

In step S32, the value of the counter NC is compared with a predetermined maximum value "4". If the value of the counter NC is not more than 4, the flow returns to step S22 to repeatedly execute the above processing. That is, the image for one line is read again in step S30.

Every time step S31 is executed, the value of the counter NC changes. For this reason, processing to be executed in steps S25 to S29 is switched. That is, the color of light emitted by the light source unit 20 is sequentially switched, so the image of each of the color components of B, C, G, Y, and R for one line is sequentially read.

Since the holder 62 holding the original moves in the direction indicated by the arrow X at a predetermined speed, the position at which the original is to be read moves every time step S30 is executed. However, the moving amount during image reading for five lines is very small. Therefore, when step S30 is repeatedly executed five times, color component data of B, C, G, Y, and R can be obtained substantially at the same position on the original.

In this example, the holder is continuously driven in the subscan direction. Alternatively, subscan drive may be performed while repeating movement and stop in units of lines. In this case, the image for five lines is read while the holder 62 is at a stand still, so the color component data at the same position can be obtained.

When the value of the counter NC exceeds 4, the flow advances to step S33. That is, when all color component data of B, C, G, Y, and R are acquired, the flow advances to step S33.

In step S33, color calculation for one line image data is executed. A color image signal processed by a device such as a color display or a color printer generally comprises three color signals of R, G, and B, which represent the levels of color components having prescribed wavelengths of R, G, and B, respectively. On the other hand, the signal obtained by processing in step S30 has five color components of B, C, G, Y, and R. In some cases, the wavelengths of B, G, and R light components emitted by the light source unit 20 do not accurately match the prescribed wavelengths of R, G, and B. Therefore, to generate a color image signal to be processed by a device such as a color display or a color printer, the color signals must be converted. This conversion is executed in step S33.

For the descriptive convenience, B, C, G, Y, and R color components obtained by processing in step S30 are defined as B1, C1, G1, Y1, and R1, respectively. In addition, signals of the B1, C1, G1, Y1, and R1 color components are defined as DB1, DC1, DG1, DY1, and DR1, respectively.

In step S33, prescribed color components of R, G, and B are obtained from the signals DB1, DC1, DG1, DY1, and DR1 using following formula (1).

$$\begin{bmatrix} R \\ G \\ B \end{bmatrix} = \begin{bmatrix} K11 & K12 & K13 & K14 & K15 \\ K21 & K22 & K23 & K24 & K25 \\ K31 & K32 & K33 & K34 & K35 \end{bmatrix} \begin{bmatrix} DR1 \\ DY1 \\ DG1 \\ DC1 \\ DB1 \end{bmatrix} \quad (1)$$

where K11 to K15, K21 to K25, and K31 to K35 are constants.

In step S33, calculation or operation for a large quantity of data must be repeated. Actual calculation is executed at a high speed using the digital signal processing unit 160.

In step S34, one line image data of R, G, and B generated in step S33 are stored in a frame memory area allocated in the memory unit 130. The write address is determined in accordance with the position in the subscan direction, i.e., the contents of the counter NL.

In step S35, the value of the counter NC is cleared to 0. In addition, the value of the counter NL representing the subscan position is updated. The value of the counter NL is incremented every time step S35 is executed.

In step S36, all the light-emitting diode chips 11 to 18 of the light source unit 20 are turned off. Subscan drive is also stopped.

When "image reading 1" shown in FIG. 10 is to be executed, the color of image data is reproduced on the basis of the five color components of B1, C1, G1, Y1, and R1 of the read image, so a color image with high color reproducibility can be obtained.

Color reproducibility in a case wherein the color of image data was reproduced on the basis of four or more color components and that in a case wherein the color of image data was reproduced on the basis of three color components were compared by a computer simulation. As a result, we confirmed that, when the color of image data was reproduced on the basis of four or more color components, the color reproducibility largely improved as compared to the case in which only three colors are used.

In "image reading 1" shown in FIG. 10, image data is read for each of the five color components. However, for example, only four color components of B1, C1, G1, and R1 or B1, G1, Y1, and R1 may be read. Even when the image is read for each of the four color components, the color reproducibility sufficiently improves as compared to the prior art. Especially, when a film having four photosensitive layers is used as an original, high color reproducibility can be obtained by reading the image while appropriately selecting the wavelengths of four color components.

"Image reading 2" executed in reading mode "2" will be described next in detail with reference to FIG. 11. The same numerals as in FIG. 10 denote the same steps in FIG. 11. In FIG. 11, steps S21B, S32B, S33B, S37, S38, and S39 are different from FIG. 10. Processing operations different from FIG. 10 will be described below.

In "image reading 2" shown in FIG. 11, only three colors of R, G, and B are used as illumination colors. Hence, the three color components of R, G, and B of the original image are sequentially read.

When the value of the counter NC is 0, step S37 is executed. In step S37, the light source control unit 170 is controlled to turn on the light-emitting diode chip 17 of the light source unit 20. All the remaining light-emitting diode chips 11, 12, 13, 14, 15, 16, and 18 are turned off. That is, the B light is emitted as illumination light.

When the value of the counter NC is 1, step S38 is executed. In step S38, the light source control unit 170 is controlled to turn on the light-emitting diode chips 12 and 14 of the light source unit 20. All the remaining light-emitting diode chips 11, 13, 15, 16, 17, and 18 are turned off. That is, the G light is emitted as illumination light.

When the value of the counter NC is 2, step S39 is executed. In step S39, the light source control unit 170 is controlled to turn on the light-emitting diode chip 13 of the light source unit 20. All the remaining light-emitting diode chips 11, 12, 14, 15, 16, 17, and 18 are turned off. That is, the R light is emitted as illumination light.

In step S32B, the value of the counter NC is compared with a predetermined maximum value "2". If the value of the counter NC is not more than 2, the flow returns to step S22 to repeat step S30. That is, image reading for one line is repeated.

When step S31 is executed, the value of the counter NC changes, so processing to be executed in steps S37 to S39 is switched. That is, the color of light emitted by the light source unit 20 is sequentially switched, so the image of each of the color components of B, G, and R for one line is sequentially read.

Since the holder 62 holding the original moves in the direction indicated by the arrow X at a predetermined speed, the position at which the original is to be read moves every time step S30 is executed. However, the moving amount during image reading for three lines is very small. Therefore, when step S30 is repeated three times, color component data of B, G, and R can be obtained substantially at the same position on the original.

The subscan speed determined in step S21B is larger than that in step S21 in FIG. 10. In "image reading 1" in FIG. 10, the image is read five times per line of the output image. In "image reading 2" in FIG. 11, the image is read three times per line of the output image. Hence, when processing shown in FIG. 11 is executed, the reading time per line of the image is shorter than that in processing shown in FIG. 10.

In step S21B, the subscan speed is determined on the basis of the reading time per line of the image. Since the reading time per line of the image is shorter, the subscan speed in step S21B is higher than that in step S21.

When the value of the counter NC exceeds 2, the flow advances to step S33B. That is, when all color component data of B, G, and R are acquired for one line, the flow advances to step S33B.

In step S33B, color calculation for one line image data is executed. Step S33B is different from step S33 only in the contents of calculation.

The signal obtained by processing in step S30 has three color components of B, G, and R. In some cases, the wavelengths of B, G, and R light components emitted by the light source unit 20 do not accurately match the prescribed wavelengths of R, G, and B. Therefore, to generate a color image signal to be processed by a device such as a color display or a color printer, the color signals are converted in step S33B. For the descriptive convenience, B, G, and R color components obtained by processing in step S30 are defined as B1, G1, and R1, respectively. In addition, signals of the B1, G1, and R1 color components are defined as DB1, DG1, and DR1, respectively.

In step S33B, prescribed color components of R, G, and B are obtained from the signals DB1, DG1, and DR1 using following formula (2).

$$\begin{bmatrix} R \\ G \\ B \end{bmatrix} = \begin{bmatrix} K11B & K12B & K13B \\ K21B & K22B & K23B \\ K31B & K32B & K33B \end{bmatrix} \begin{bmatrix} DR1 \\ DG1 \\ DB1 \end{bmatrix} \quad (2)$$

where K11B to K13B, K21B to K23B, and K31B to K33B are constants.

In step S33B, calculation for a large quantity of data must be repeated. Actual calculation is executed at a high speed using the digital signal processing unit 160.

The operation realized by "image reading 2" shown in FIG. 11 is basically the same as that of the conventional operation. That is, when reading mode "2" is designated, the same operation as that of the conventional apparatus is executed. For example, when an image on an original having relatively low image quality is read, particularly high color reproducibility is unnecessary. For this reason, "image reading 2" shown in FIG. 11 may be performed. Since the subscan speed of processing shown in FIG. 11 is higher than that of processing in FIG. 10, the entire image of the original can be read in a short time.

"Image reading 3" executed in reading mode "3" will be described next in detail with reference to FIG. 12. The same numerals as in FIG. 10 denote the same steps in FIG. 12.

In FIG. 12, steps S21C, S32B, S33C, S41, S38, and S42 are different from FIG. 10. Processing operations different from FIG. 10 will be described below.

In "image reading 3" shown in FIG. 12, only three colors of R, G, and B are used as illumination colors. Hence, the three color components of R, G, and B of the original image are sequentially read. However, the illumination colors of R and B in FIG. 12 are slightly different from those in FIG. 10.

When the value of the counter NC is 0, step S41 is executed. In step S41, the light source control unit 170 is controlled to turn on the light-emitting diode chips 16, 17, and 18 of the light source unit 20. All the remaining light-emitting diode chips 11, 12, 13, 14, and 15 are turned off.

As shown in FIG. 4, the wavelength of C is relatively close to the wavelength of B. When the two types of light-emitting diode chips 16, 17, and 18 are simultaneously turned on, illumination light having a wavelength which can substantially be classified into B can be obtained. When the two types of light-emitting diode chips 16, 17, and 18 are turned on, the emission intensity becomes higher than that in a case wherein only one type of light-emitting diode chip 17 is turned on.

When the value of the counter NC is 1, step S38 is executed. In step S38, the light source control unit 170 is controlled to turn on the light-emitting diode chips 12 and 14 of the light source unit 20. All the remaining light-emitting diode chips 11, 13, 15, 16, 17, and 18 are turned off. That is, G light is emitted as illumination light.

When the value of the counter NC is 2, step S42 is executed. In step S42, the light source control unit 170 is controlled to turn on the light-emitting diode chips 11, 13, and 15 of the light source unit 20. All the remaining light-emitting diode chips 12, 14, 16, 17, and 18 are turned off.

As shown in FIG. 4, the wavelength of Y is relatively close to the wavelength of R. When the two types of light-emitting diode chips 11, 13, and 15 are simultaneously turned on, illumination light having a wavelength which can substantially be classified into R can be obtained. When the two types of light-emitting diode chips 11, 13, and 15 are turned on, the emission intensity becomes higher than that in a case wherein only one type of light-emitting diode chip 13 is turned on.

In step S32B, the value of the counter NC is compared with a predetermined maximum value "2". If the value of the counter NC is not more than 2, the flow returns to step S22 to repeat step S30. That is, image reading for one line is repeated.

When step S31 is executed, the value of the counter NC changes, so processing to be executed in steps S41, S38, and S42 is switched. That is, the color of light emitted by the light source unit 20 is sequentially switched, so the image of each of the color components of B, G, and R for one line is sequentially read.

Since the holder 62 holding the original moves in the direction indicated by the arrow X at a predetermined speed, the position at which the original is to be read moves every time step S30 is executed. However, the moving amount during image reading for three lines is very small. Therefore, when step S30 is repeated three times, color component data of B, G, and R can be obtained essentially at the same position on the original.

The subscan speed determined in step S21C is much larger than that in step S21 or S21B. In "image reading 2" in FIG. 11 and "image reading 3" in FIG. 12, the image is read three times per line of the output image. However, in "image reading 3" in FIG. 12, a plurality of types of light-emitting diode chips are simultaneously turned on to obtain the B and G illumination light components. For this reason, the illumination intensity of processing in FIG. 12 is higher than that of processing in FIG. 11. When the illumination intensity is high, the original exposure time (charging time of the linear image sensor 61) can be shortened. The reading time per line of the image is also shortened.

In step S21C, the subscan speed is determined on the basis of the reading time per line of the image. Since the reading time per line of the image is shorter, the subscan speed in step S21C is higher than that in step S21B.

When YES in step S32B, i.e., the value of the counter NC exceeds 2, the flow advances to step S33C. That is, when all color component data of B, G, and R are acquired for one line, the flow advances to step S33C.

In step S33C, color calculation for one line image data is executed. Step S33C, S33, and S33B are different only in the contents of calculation.

The signal obtained by processing in step S30 has three color components of B, G, and R. In some cases, the wavelengths of B, G, and R light components emitted by the light source unit 20 do not accurately match the prescribed wavelengths of R, G, and B. Therefore, to generate a color image signal to be processed by a device such as a color display or a color printer, the color signals are converted in step S33C. For the descriptive convenience, B, G, and R color components obtained by processing in step S30 are defined as B2, G1, and R2, respectively. In addition, signals of the B2, G1, and R2 color components are defined as DB2, DG1, and DR2, respectively.

In step S33C, prescribed color components of R, G, and B are obtained from the signals DB2, DG1, and DR2 by following formula (3).

$$\begin{bmatrix} R \\ G \\ B \end{bmatrix} = \begin{bmatrix} K11C & K12C & K13C \\ K21C & K22C & K23C \\ K31C & K32C & K33C \end{bmatrix} \begin{bmatrix} DR2 \\ DG1 \\ DB2 \end{bmatrix} \quad (3)$$

where K11C to K13C, K21C to K23C, and K31C to K33C are constants.

In step S33C, calculation for a large quantity of data must be repeated. Actual calculation is executed at a high speed using the digital signal processing unit 160.

When "image reading 3" shown in FIG. 12 is executed, the entire image of the original can be read in a time shorter than in "image reading 2" shown in FIG. 11. However, the color reproducibility of the image is slightly lower in "image reading 3" than in "image reading 2". However, when an image or an original having relatively low image quality is read, particularly high color reproducibility is unnecessary. For this reason, "image reading 3" shown in FIG. 12 may be performed in accordance with user's intention.

When "image reading 1", "image reading 2", or "image reading 3" is executed, the color component to be read is sequentially switched every time one line of the image is scanned. On the other hand, when "image reading 4" shown in FIG. 13, "image reading 5" shown in FIG. 14, or "image reading 6" shown in FIG. 15 is executed, the color component to be read is sequentially switched every time one frame of the image is scanned.

"Image reading 4" executed in reading mode "4" will be described in detail with reference to FIG. 13.

In step S50, the contents of the counters NC and NL allocated in the internal memory are initialized. The value of the counter NC represents the number assigned to the color of illumination. Actually, the value "0", "1", "2", "3", and "4" of the counter NC correspond to the B, C, G, Y, and R color components of light emitted by the light source unit 20, respectively. The value of the counter NL represents the scanning position in the subscan direction (X direction). Actually, every time one line image is read, the value of the counter NL is updated.

In step S51, an instruction is issued to the subscan control unit 180 to start subscan drive. The electrical motor M1 is driven to move the holder 62 for supporting the original in the direction indicated by the arrow X at a predetermined speed. The holder 62 may be driven stepwise using a stepping motor as the electrical motor M1.

When the holder 62 moves, the relative positional relationship between the image reading position and the original supported by the holder 62 changes.

In step S52, the next processing is selected in accordance with the value of the counter NC. When the value of the counter NC is "0", "1", "2", "3", or "4", the flow advances to step S53, S54, S55, S56, or S57, respectively.

In step S53, the light source control unit 170 is controlled to turn on the light-emitting diode chip 17 of the light source unit 20. All the remaining light-emitting diode chips 11, 12, 13, 14, 15, 16, and 18 are turned off. That is, B light is emitted as illumination light.

In step S54, the light source control unit 170 is controlled to turn on the light-emitting diode chips 16 and 18 of the light source unit 20. All the remaining light-emitting diode chips 11, 12, 13, 14, 15, and 17 are turned off. That is, C light is emitted as illumination light.

In step S55, the light source control unit 170 is controlled to turn on the light-emitting diode chip 12 and 14 of the light source unit 20. All the remaining light-emitting diode chips 11, 13, 15, 16, 17, and 18 are turned off. That is, G light is emitted as illumination light.

In step S56, the light source control unit 170 is controlled to turn on the light-emitting diode chips 11 and 15 of the light source unit 20. All the remaining light-emitting diode chips 12, 13, 14, 16, 17, and 18 are turned off. That is, Y light is emitted as illumination light.

In step S57, the light source control unit 170 is controlled to turn on the light-emitting diode chip 13 of the light source unit 20. All the remaining light-emitting diode chips 11, 12, 14, 15, 16, 17, and 18 are turned off. That is, R light is emitted as illumination light.

In step S58, it is determined whether image reading has been completed for one frame. More specifically, the value of the counter NL is compared with a predetermined threshold value to determine whether the scanning position in the subscan direction has moved by one frame. If NO in step S58, the flow advances to step S59. If YES in step S58, the flow advances to step 562.

In step S59, the state of a line synchronizing signal which periodically appears every time one line image is read is monitored to determine whether a predetermined line synchronization timing is detected. If YES in step S59, the flow advances from step S59 to step 560.

In step 560, an image is read for one line. More specifically, transmission light from the original illuminated with any one of the B, C, G, Y, and R light components is read by the linear image sensor 61 for one line.

The signal output from the linear image sensor 61 is input to the memory unit 130 through the sampling unit 110 and A/D converter 120. The signal input to the memory unit 130 is one of color signal components obtained by separating the image into five colors: B, C, G, Y, and R.

The memory unit 130 holds the input color signal for one line in a frame memory area allocated in the internal memory. The write address is determined in accordance with the counter NL. The color signal components of B, C, G, Y, and R are held by different frame memories.

In step S61, the value of the counter NC is updated. Every time step S61 is executed, the value of the counter NC is incremented by one.

Processing in step S60 is repeated until the completion of image reading for one frame is detected in step S58. Therefore, an image signal of one frame associated with any one of colors B, C, G, Y, and R is stored in one frame memory area of the memory unit 130.

When image reading for one frame associated with one color is completed the flow advances from step S58 to step S62.

In step S62, the value of the counter NL is initialized to 0. In addition, the value of the counter NC is updated. The value of the counter NC is incremented by one every time step S62 is executed.

In step S63, the value of the counter NC is compared with a predetermined maximum value "4". If the value of the counter NC is not more than 4, the flow advances to step S64. When the value of the counter NC exceeds 4, the flow advances to step S65.

In step S64, the electrical motor M1 is controlled through the subscan control unit 180 to return the subscan position to the reading start position. More specifically, the driving direction of the electrical motor M1 is reversed to move the holder 62 to the position at which step S51 has been executed. After this, the driving direction of the electrical motor M1 is reversed again to return the moving direction of the holder 62 to the forward direction of subscan. That is, the holder 62 is reciprocally driven in the direction indicated by the arrow X every time one frame image associated with one color is read. After step S64 is executed, the flow returns to step S52. Image reading for one frame and one color is executed again by processing in steps S58 to S61.

When step S62 is executed, the value of the counter NC changes, so processing to be executed in steps S53 to S57 is switched. That is, the color of light emitted by the light source unit 20 is sequentially switched, so the image of each of the color components of B, C, G, Y, and R for one frame is sequentially read.

When the value of the counter NC exceeds 4, the flow advances from step S63 to step S65. That is, when all color component data of B, C, G, Y, and R for one frame image have been acquired, the flow advances to step S65.

In step S65, all the light-emitting diode chips 11 to 18 of the light source unit 20 are turned off. Subscan drive is also stopped.

In step S66, color calculation is executed for all image data of one frame. The contents of processing are the same as in step S33 except that the data to be processed is data of one frame.

More specifically, prescribed color components of R, G, and B are obtained from the signals DB1, DC1, DG1, DY1, and DR1 using formula (1) above. The R, G, and B image data for one frame, which are generated in step S66, are stored in frame memory areas allocated in the memory unit 130.

"Image reading 5" executed in reading mode "5" will be described next in detail with reference to FIG. 14. The same numerals as in FIG. 13 denote the same steps in FIG. 14.

In FIG. 14, steps S63B, S66B, S71, S72, and S73 are different from FIG. 13. Processing operations different from FIG. 13 will be described below.

In "image reading 5" shown in FIG. 14, only three colors of R, G, and B are used as illumination colors. Hence, the three color components of R, G, and B of the original image are sequentially read.

When the value of the counter NC is 0, step S71 is executed. In step S71, the light source control unit 170 is controlled to turn on the light-emitting diode chip 17 of the light source unit 20. All the remaining light-emitting diode chips 11, 12, 13, 14, 15, 16, and 18 are turned off. That is, B light is emitted as illumination light.

When the value of the counter NC is 1, step S72 is, executed. In step S72, the light source control unit 170 is controlled to turn on the light-emitting diode chips 12 and 14 of the light source unit 20. All the remaining light-emitting diode chips 11, 13, 15, 16, 17, and 18 are turned off. That is, G light is emitted as illumination light.

When the value of the counter NC is 2, step S73 is executed. In step S73, the light source control unit 170 is controlled to turn on the light-emitting diode chip 13 of the light source unit 20. All the remaining light-emitting diode chips 11, 12, 14, 15, 16, 17, and 18 are turned off. That is, R light is emitted as illumination light.

In step S63B, the value of the counter NC is compared with a predetermined maximum value "2". If the value of the counter NC is not more than 2, the flow returns to step S52 via step S64 to repeat steps S58 to S61. That is, image reading for one frame and one color is repeated.

When the value of the counter NC exceeds 2, the flow advances to step S66B via step S65. That is, when all color component data of B, G, and R for one frame image are acquired, the flow advances to step S66B.

In step S66B, color calculation is executed for all image data of one frame. Steps S66B and S66 are different only in the contents of processing. That is, the contents of processing are the same as in step S33B except that the data to be processed is data of one frame. More specifically, prescribed color components of R, G, and B are obtained from the signals DB1, DG1, and DR1 using formula (2) above. The R, G, and B image data for one frame, which are generated in step S66B, are stored in frame memory areas assigned on the memory unit 130.

The operation realized by "image reading 5" shown in FIG. 14 is basically the same as that of the conventional operation. That is, when reading mode "5" is designated, the same operation as that of the conventional apparatus is executed. For example, when an image on an original having relatively low image quality is to be read, particularly high color reproducibility is unnecessary. For this reason, "image reading 5" shown in FIG. 14 may be performed. Since the number of times of frame scanning for image reading is smaller in processing shown in FIG. 14 than that in processing in FIG. 13, the entire image of the original can be read in a short time.

"Image reading 6" executed in reading mode "6" will be described next in detail with reference to FIG. 15. The same numerals as in FIG. 13 denoted the same steps in FIG. 15.

In FIG. 15, steps S51C, S63B, S66C, S74, S75, and S76 are different from FIG. 13. Processing operations different from FIG. 13 will be described below.

In "image reading 6" shown in FIG. 15, only three colors of R, ,G and B are used as illumination colors. Hence, the three color components of R, G, and B of the original image are sequentially read. However, the illumination colors of R and B in FIG. 15 are slightly different from those in FIG. 13.

When the value of the counter NC is 0, step S74 is executed. In step S74, the light source control unit 170 is controlled to turn on the light-emitting diode chips 16, 17, and 18 of the light source unit 20. All the remaining light-emitting diode chips 11, 12, 13, 14, and 15 are turned off.

As shown in FIG. 4, the wavelength of C is relatively close to the wavelength of B. When the two types of light-emitting diode chips 16, 17, and 18 are simultaneously turned on, illumination light having a wavelength which can substantially be classified into B can be obtained. When the two types of light-emitting diode chips 16, 17, and 18 are turned on, the emission intensity becomes higher than that in a case wherein only one type of light-emitting diode chip 17 is turned on.

When the value of the counter NC is 1, step S75 is executed. In step S75, the light source control unit 170 is controlled to turn on the light-emitting diode chips 12 and 14 of the light source unit 20. All the remaining light-emitting diode chips 11, 13, 15, 16, 17, and 18 are turned off. That is, G light is emitted as illumination light.

When the value of the counter NC is 2, step S76 is executed. In step S76, the light source control unit 170 is controlled to turn on the light-emitting diode chips 11, 13, and 15 of the light source unit 20. All the remaining light-emitting diode chips 12, 14, 16, 17, and 18 are turned off.

As shown in FIG. 4, the wavelength of Y is relatively close to the wavelength of R. When the two types of light-emitting diode chips 11, 13, and 15 are simultaneously turned on, illumination light having a wavelength which can substantially be classified into R can be obtained. When the two types of light-emitting diode chips 11, 13, and 15 are turned on, the emission intensity becomes higher than that in a case wherein only one type of light-emitting diode chip 13 is turned on.

In step S63B, the value of the counter NC is compared with a predetermined maximum value "2". If the value of the counter NC is not more than 2, the flow returns to step S52 via step S64 to repeat steps S58 to S61. That is, image reading for one frame and one color is repeated.

The subscan speed determined in step S51C is much higher than that in step S51.

In "image reading 6" in FIG. 15, a plurality of types of light-emitting diode chips are simultaneously turned on to obtain the B and G illumination light components. For this reason, the illumination intensity is higher in processing shown in FIG. 15 than that in processing in FIG. 13 or 14.

When the illumination intensity is high, the original exposure time (charging time) of the linear image sensor 61 can be shortened. The reading time per frame of the image is also shortened.

In step S51C, the subscan speed is determined on the basis of the charging time per line of the image. Since the reading time per frame of the image is shorter, the subscan speed in step S51C is higher than that in step S51.

When the value of the counter NC exceeds 2, the flow advances to step S66C via step S65. That is, when all color component data of B, G, and R for one frame image have been acquired, the flow advances to step S66C.

In step S66C, color calculation is executed for all image data of one frame. Step S66C is different from step S66 or S66b only in the contents of processing. That is, the contents of processing are the same as in step S33C except that the data to be processed is data of one frame. More specifically, prescribed color components of R, G, and B are obtained from the signals DB2, DG1, and DR2 using formula (3) above. The R, G, and B image data for one frame, which are generated in step S66C, are stored in frame memory areas assigned on the memory unit 130.

When "image reading 6" shown in FIG. 15 is executed, the entire image of the original can be read in a time shorter than in "image reading 5" shown in FIG. 14. However, the color reproducibility of the image is slightly lower in "image reading 6" than in "image reading 5". However, when an image reading on an original having relatively low image quality is to be read, particularly high color reproducibility is unnecessary. For this reason, "image reading 6" shown in FIG. 15 may be performed in accordance with the user's intention.

In this embodiment, the image reading apparatus 60 for reading a film-shaped original has been described. However, the present invention can also be practiced for a general image scanner.

In the above embodiment, the light source unit 20 uses five types of light-emitting devices having different peak emission wavelengths in the visible light range. However, four types of light-emitting devices may be used. Alternatively, the number of types of light-emitting devices may be increased to six or more.

In the above embodiment, the output color image data has R, G, and B color components. However, only by changing the contents of formulas (1), (2), and (3), data of the XYZ color system or Lab colorimetric system can also be output.

In the above embodiment, color conversion using formulas (1), (2), and (3) is executed inside the image reading apparatus 60. However, this color conversion may be omitted, and instead, color conversion may be executed on the host computer side.

What is claimed is:

1. A color image reading apparatus comprising:
    a color separation unit to separate a color of an image of an object into more than three visible color wavelength components other than infrared light;

an image sensing unit to read the image of the object whose color is separated by said color separation unit and outputting image signals of the respective colors; and a color calculation circuit to calculate image data of not less than three colors from the image signals corresponding to the colors separated by said color separation unit.

2. An apparatus according to claim 1, further comprising a reading mode setting unit for setting any one of a first mode in which the color of the image of the object is separated into three visible color wavelength components by said color separation unit and a second mode in which the color of the image of the object is separated into more than three visible color wavelength components by said color separation unit, and wherein said color separation unit separates the color of the image of the object in accordance with setting by said reading mode setting unit.

3. An apparatus according to claim 2, wherein said color calculation circuit calculates the image data of not less than three colors from the image signals of three colors when the first mode is set by said reading mode setting unit, and calculates the image data of not less than three colors from the image signals of not less than four colors when the second mode is set by said reading mode setting unit.

4. An apparatus according to claim 1, wherein said color separation unit comprises a light source for emitting light components of more than three different colors, and a color selection circuit for causing said light source to emit light while selecting one or some of the colors.

5. An apparatus according to claim 4, further comprising multiple color simultaneous emission mode setting means for setting a multiple color simultaneous emission mode, and wherein in separating a specific color, said color selection circuit causes said light source to emit at least two colors simultaneously on the basis of setting by said multiple color simultaneous emission mode setting means.

6. A method of reading a color image, comprising:

separating a color of an image of an object into more than three visible color wavelength components other than infrared light;

reading the image of the object whose color has been separated by the separating;

outputting image signals of the respective colors that was read; and calculating image data of not less than three colors based on the separating.

7. The method of claim 6, wherein the more than three visible colors are red, green, blue, cyan and yellow.

8. The method of claim 6, further comprising converting the more than three visible color wavelength components into three visible wavelength components.

9. A method of reading a color image, comprising:

separating a color of an image of an object into more than three visible color wavelength components other than infrared light; and calculating image data of more than three visible colors based on the separating.

10. The method of claim 9, wherein the more than three visible colors are red, green, blue, cyan and yellow.

11. The method of claim 9, further comprising converting the more than three visible color wavelength components into three visible wavelength components.

* * * * *